(12) United States Patent
Bernardini et al.

(10) Patent No.: US 6,455,835 B1
(45) Date of Patent: Sep. 24, 2002

(54) SYSTEM, METHOD, AND PROGRAM PRODUCT FOR ACQUIRING ACCURATE OBJECT SILHOUETTES FOR SHAPE RECOVERY

(75) Inventors: Fausto Bernardini; Henning Biermann, both of New York; Holly E. Rushmeier, Mount Kisco, all of NY (US); Silvio Savarese, Pasadena, CA (US); Gabriel Taubin, Hartsdale, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/825,685

(22) Filed: Apr. 4, 2001

(51) Int. Cl.$^7$ ............................................... H01L 27/00
(52) U.S. Cl. .................................... 250/208.1; 356/613
(58) Field of Search ........................... 250/208.1, 201.5, 250/201.7; 382/203, 204, 131, 154; 356/390, 391, 613

(56) References Cited

U.S. PATENT DOCUMENTS

| | | | |
|---|---|---|---|
| 4,604,807 A | 8/1986 | Bock et al. | |
| 4,792,696 A | 12/1988 | Kender et al. | |
| 4,873,651 A | 10/1989 | Raviv | |
| 6,289,107 B1 * | 9/2001 | Borschers et al. | 356/391 |

OTHER PUBLICATIONS

"Volumetric Descriptions of Objects from Multiple Views," Martin et al., 1983 IEEE, 9 pp. (Month Unknown).
"Acquiring 3–D Models from Sequences of Contours," Jiang Yu Zheng, vol. 16, Feb. 1994, IEEE, pp. 163–178.
"How Far 3D Shapes Can Be Understood from 2D Silhouettes," Aldo Laurentini, vol. 17, No. 2, Feb. 1995, pp. 188–195.
"Efficient Representation of Object Shape for Silhouette Intersection," Jones et al., vol. 142, No. 6, Dec. 1995, IEE, pp. 359–365.

* cited by examiner

*Primary Examiner*—Que T. Le
(74) *Attorney, Agent, or Firm*—Ohlandt, Greeley, Ruggiero & Perle, LLP; Louis J. Percello, Esq.

(57) ABSTRACT

Disclosed are methods and apparatus for obtaining the shape of an object by observing silhouettes of the object. At least one point light source is placed in front of the object, thereby casting a shadow of the object on a translucent panel that is placed behind the object. A camera, or other imaging device, captures an image of the shadow from behind the translucent panel. The object's full silhouette is obtained from the image of the shadow as the region of the shadow is substantially darker than the region outside of the shadow. The full silhouette thus obtained may be processed by any suitable shape from silhouette algorithm, and thus objects are not limited in topological type. A color image of the object can optionally be obtained simultaneously with the shadow image using a camera placed on the same side of the object as the light source. Multiple silhouettes can be captured for one object position, reducing the number of rotations needed on a turntable system, and reducing the post-processing needed to register geometries obtained from multiple different positions.

28 Claims, 8 Drawing Sheets

SYSTEM, METHOD, AND PROGRAM PRODUCT FOR ACQUIRING ACCURATE OBJECT SILHOUETTES FOR SHAPE RECOVERY

FIELD OF THE INVENTION

The teachings of this invention relate generally to computer vision and computer graphics and, more specifically, the teachings of this invention relate to techniques for acquiring silhouettes from an image.

BACKGROUND OF THE INVENTION

A number of different techniques have been developed to compute shapes from silhouettes or contours in the field of computer imaging.

The teachings herein address the problem of acquiring a numerical description of the shape of an object. Given a numerical description of the object's shape it is possible, using well-known computer graphics algorithms, to generate images of the object from different points of view and under different lighting conditions. One important application of such synthetic imagery is in e-commerce, where the seller of an object allows potential customers to inspect a virtual copy of an object interactively using a computer. Numerical representations of objects can be used for other purposes. such as in CAD (computer-aided design) systems as a starting point for the design of new objects.

A class of popular methods for acquiring a numerical representation of an object's shape is known as shape from silhouette, also referred to by similar names such as shape from occluding contour or shape from boundaries. Shape from silhouette algorithms use an image of an object captured by a camera, or any other imaging device. Using the known position of the camera, and the silhouette of the object in the image (i.e. the curve that marks the boundary in the image between the object and the background), an estimate of the numerical shape can be made. A very crude estimate of shape can be obtained from a single image. An improved estimate is obtained using a number of silhouettes from images of the object in different positions relative to the camera.

Many algorithms have been devised to compute a numerical description of the three dimensional shape of an object from silhouettes. One class of algorithms is known as volumetric or space carving, as originally described by Martin and Aggrawal (Worthy N. Martin and J. K Agrawal, "Volumetric Descriptions of Objects from Multiple Views", IEEE Transactions on Pattern Analysis and Machine Intelligence, Vol. PAMI-5, No. 2, March 1983, pp. 150–158.) In this technique a volume of small boxes is numerically defined that completely encloses the object. For each image the boxes are projected onto an image plane. If the projection of a box falls outside of the object silhouette, it is marked as "outside" and is eliminated from a current estimate of the object shape. As each silhouette image is considered more of the boxes are eliminated, or "carved away" from the initial volume. The boxes remaining after all of the silhouette images have been examined is the estimate of the object's shape. A smooth representation of the surface of the object can then be obtained by any well-known isosurface algorithm.

An alternative class of algorithms for extracting shape from silhouettes uses the variation of contour shape in successive images. An example is described by Zheng (Jiang Yu Zheng, "Acquiring 3-D Models from Sequences of Contours", IEEE Transactions on Pattern Analysis and Machine Intelligence, Vol. 16, No. 2, February 1994, pp. 163–178.) In this method, many silhouette images are obtained as the object is rotated in front of the camera. An estimate of 3D location of points on the object's surface is obtained from the location of silhouettes in the image relative to the projection of the axis of rotation, and the rate of change of these positions with respect to angular change.

There are fundamental limitations on the accuracy of the shape that can be recovered by shape from silhouettes, as discussed by Laurentini (Aldo Laurentini, "How Far 3D Shapes Can Be Understood from 2D Silhouettes", IEEE Transactions on Pattern Analysis and Machine Intelligence, Vol. 17, No. 2, February 1995, pp. 188–195.). For example, object concavities will not appear in silhouettes, and so will not be captured. To provide the illusion of concavities, and to add color to the model, capture systems generally acquire color images of the object from known camera positions. These color images can be related to the captured geometry by the well-known computer graphics technique known as projective texture mapping. Geometries (generally in the form of triangular meshes) with texture maps can be displayed with hardware and software available on typical personal computers.

A basic operation required by either class of the shape from silhouette algorithms is the accurate extraction of the boundary between the object and the background. This is an example of the classic image segmentation problem from the field of image processing. Systems for extracting shape attempt to simplify the segmentation by designing a suitable backdrop. An example of such a design is illustrated in Jones and Oakely (M. Jones and J. P. Oakley, "Efficient representation of object shape for silhouette intersection", IEEE Proc.-Vis. Image Signal Process, Vol. 142, No. 6, December 1995, pp. 359–364.) The backdrop for the object is painted a uniform color (in the case of Jones and Oakely "Chromakey Blue"). The silhouette is defined as the boundary of the image regions that are the uniform background color.

An alternative approach uses a large flat diffuse light source in place of the colored backdrop. The silhouette is defined as the boundary of the bright image regions, with the object itself generally appearing dark.

Shape from silhouettes, particularly with the addition of color textures, is a popular technique because it can be implemented inexpensively. The major cost of the system resides in the camera and in a mechanism to control the position of the object, such as a turntable. The implementation with volume carving is particularly attractive for applications because the method guarantees a closed surface.

An alternative and related method for capturing object shape is "shape from shadows", as described in U.S. Pat. Nos.: 4,792,696 and 4,873,651. These methods are similar to shape from silhouettes, since a sharp shadow is the silhouette projected from a point light source. In both of these patents the camera is placed on the same side of the object as the direction of light incident on the object, and images are taken of the shadows cast by the object. In both of these patents it is assumed that the surface is a height field. That is, the object sits on a reference plane with locations on the plane specified by (x,y) Cartesian coordinates. The shape of the object is given by a third coordinate z that is descriptive of the height of the object surface above the reference plane. With this assumption, the shape of the object surface is inferred from where shadows begin and end, and from knowledge of the light source direction.

U.S. Pat. No.: 4,604,807 employs a shadow that is observed using a camera on the opposite side of the object from the light source. In this patent the shadow is formed by pressing a relatively flat object, e.g., a person's foot, onto a translucent panel. The shadow is observed from the opposite side to obtain a numerical description of the two dimensional area of the foot, and is not used to estimate the three dimensional shape of the foot.

In an article by Leibe et al. (B. Leibe, T. Starner, W. Ribarsky, Z. Wartell, D. Krum, J. Weeks, B. Singletary and L. Godges, "Toward Spontaneous Interaction with the Perceptive Workbench", IEEE Computer Graphics and Applications, November/December 2000, pp. 54–65.) a system is described that observes shadows cast by objects on a translucent table with a camera located underneath the table. The system can produce only a crude estimate of shape, because the object cannot be repositioned in a calibrated manner.

All of the prior art techniques known to the inventors assume that an accurate silhouette can be extracted from the image. However, if an accurate silhouette cannot be extracted, then the shape of the object will be inaccurate.

The segmentation approach fails if the object is shiny, transparent, or is same color as the background. Segmentation can also fail even with the use of a large diffused light source.

A number of other problems are encountered with the prior art techniques for finding object silhouettes. First consider the approach of using a background of known color. The silhouette is detected where the backdrop color ends in the image. This method fails for glossy objects that reflect some of the background color in the direction of the camera, and for objects which transmit light. This method also fails when camera characteristics cause "bleeding" of color from one region of the image to another. The method can also fail if inter-reflections on the object cast color from the background onto the object. The method also fails if the object happens to be the same color as the backdrop.

Some methods attempt to avoid these problems by taking an image of the backdrop alone and then an image of the object in front of the background, and then taking the difference between the two images. However, this approach fails for very shiny objects. It also fails when any shadow is cast by the object onto the backdrop.

The approach of using a large diffuse light source seeks to avoid the problem of the object possibly being the same color as the background. However, this technique also fails for shiny surfaces, light transmitting surfaces, and for surfaces in which self-interreflections transmit light from the backdrop onto the object. This approach also prevents the simultaneous acquisition of color images to be used as texture maps, since the bright background causes most of the object to appear very dark in the image. Having to acquire the color images separately extends the length of time required to obtain the numerical description of the object.

Both of the backdrop approaches allow only one silhouette to be obtained for each position of the object. For simple systems employing a device with one degree of freedom to provide accurate positioning, such as a turntable, one position of the object on the turntable may not be adequate to obtain a view of the entire object surface. The object is placed once, a series of images is obtained for one rotation of the device. The object is placed in a different position relative to the turntable, and another series is obtained. This process may need to be repeated many times, and the geometries recovered by each rotation must be registered to one another by an additional geometric processing step.

The methods that employ shadows have been in part motivated by the problem of segmentation from the backdrop when shiny objects are being scanned. However, for the shadow methods, with the camera in the same direction as the direction of incident light, the problem remains of separating the image of the object and the image of its shadow. Such segmentation is difficult for objects with a dark or partially dark surface, and is impossible for black objects. The shadow methods are also limited by the height field assumption for 3-D shape recovery. Objects with even moderately complex topologies, e.g., a coffee mug with a handle, cannot be measured with such techniques without substantial error.

The method described in U.S. Pat. No.: 4,604,807 employs optics and geometry that require that the object being measured rest against the translucent panel, and that the object shape is almost flat. The apparatus can only measure 2-D areas, and cannot be used to capture silhouettes of objects of arbitrary shape for 3-D shape recovery.

The system described by Leibe et al. requires the object to be scanned to. sit on a fixed translucent surface. Although the shape of some objects can be estimated from a sparse set of views spanning the full space of directions around the object, the system described by Leibe et al. is limited to shadows that can be cast from light sources above the translucent surface. The goal of the Leibe et al. system is to produce crude shape representations only, and the design does not permit the calibrated repositioning of an object, nor does it include a way to obtain additional information, such as shape from photometric data, to improve the estimate of shape and to include concavities. The system includes a side camera above the translucent surface, but obtaining silhouettes from this camera presents all of the problems of traditional silhouette extraction, and cannot, for example, be used for shiny objects.

OBJECTS AND ADVANTAGES OF THE INVENTION

It is a first object and advantage of this invention to provide an improved system and method to obtain 3-D shapes from one or more images.

It is a further object and advantage of this invention to provide a system and method for deriving the surface shape of an object from shadow images of the object obtained from behind a translucent panel that is interposed between an image capture device, referred to for convenience as a camera, and the object, where the object is interposed between the front of the translucent panel and one or more point light sources.

SUMMARY OF THE INVENTION

The foregoing and other problems are overcome and the foregoing objects and advantages are realized by methods and apparatus in accordance with embodiments of this invention.

Disclosed herein are embodiments of apparatus for obtaining the silhouette of an object in a form suitable for use by a shape from silhouette algorithm for obtaining a numerical description of the object's three dimensional shape. Also disclosed are methods for processing the output of the apparatus into a numerical description of the object that is suitable for interactive display on a computer graphics system.

More particularly, disclosed herein are methods and apparatus for obtaining the shape of an object by observing silhouettes of the object. At least one light source, preferably a point light source, is placed in front of the object, thereby casting a shadow of the object on a translucent panel that is placed behind the object. An imaging device, referred to for convenience as a camera, captures an image of the shadow from behind the translucent panel. The silhouette or shadow contour is obtained from the image of the shadow as the region of the shadow that is substantially darker than the region outside of the shadow. This is true for any opaque object regardless of its surface finish or shape. By using a point light source, rather than a large diffuse light source, the quantity of light reflected by the object in the direction of the translucent panel is orders of magnitude smaller than light that impinges on the panel directly from the point source, thereby enhancing the contrast between the object's shadow and the illumination from the light source. A further benefit obtained by the use of the point light source is that the object need not be in contact with the translucent panel to obtain a shadow having sharp edges. The full object silhouette is obtained since nothing (including the object itself) is in the path between the camera and the translucent panel. The full silhouette obtained can be processed by any suitable shape from silhouette algorithm, and thus the to be imaged are not limited in topological type. Unlike systems with large diffuse lights as backgrounds, which make the object appear black, a color image of the object can optionally be obtained simultaneously with the shadow image by using another camera, such as a color camera, that is placed on the same side of the object as the light source. Unlike conventional silhouette systems, multiple silhouettes can be captured for one object position, reducing the number of rotations needed on a turntable system, and reducing the post-processing needed to register geometries obtained from multiple different positions.

In accordance with the teachings herein, a system and method is disclosed for obtaining a three dimensional image of an object. The method includes the steps of (a) shining light from at least one light source on to the object from a first direction to create a first shadow cast by the object on a first surface of a translucent panel, where the object is disposed between a light source and the first surface of the translucent panel and has a first pose; (b) obtaining a first digital image of the first shadow from a second, opposite surface of the translucent panel; (c) changing the pose of the object and obtaining additional digital images of additional shadows cast by the object for different object poses; and (d) processing the first and the additional digital images to create a three dimensional image of the object. The step of processing preferably employs a space carving process. The step of processing operates to identify a boundary of the image of the shadow in each of the first and additional digital images, where the boundary is identified in a given one of the digital images by applying a pixel thresholding process to determine whether a given pixel is located within the image of the shadow or outside of the image of the shadow. The step of processing further defines a virtual volume as a list of volume elements, projects individual ones of the volume elements onto the plane of the image of the shadow, and retains only those volume elements in the list that lie within the image of the shadow or on the identified boundary. The step of processing then further applies an isosurface extraction algorithm to the list of surviving volume elements to obtain a numerical description of the shape of the surface of the object.

The step of shining light on to the object can also be done from a second, or third, or fourth, etc., direction to create an additional shadow or shadows cast by the object on the first surface of the translucent panel. The resulting shadow image(s) are processed in the same manner as the first shadow. A plurality of light sources each having a different color can be used, as can array of light sources that are operated in sequence. A single light source may be translated with respect to the object to shine light on the object from a plurality of different directions.

Further in accordance with these teachings the method may include additional steps of obtaining a digital image of the object for each object pose; processing the digital images of the object to derive surface normals and color maps; and applying the surface normals and color maps to the surface of the three dimensional image of the object.

BRIEF DESCRIPTION OF THE DRAWINGS

The above set forth and other features of the invention are made more apparent in the ensuing Detailed Description of the Invention when read in conjunction with the attached Drawings, wherein:

FIGS. 2a and 2b are diagrams depicting ideal properties of the light source and the translucent panel shown in FIG. 1, wherein FIG. 2a illustrates an ideal light scattering distribution for the translucent panel, and FIG. 2b shows an ideal light emission distribution for the light source.

DETAILED DESCRIPTION OF THE INVENTION

Figure 1:
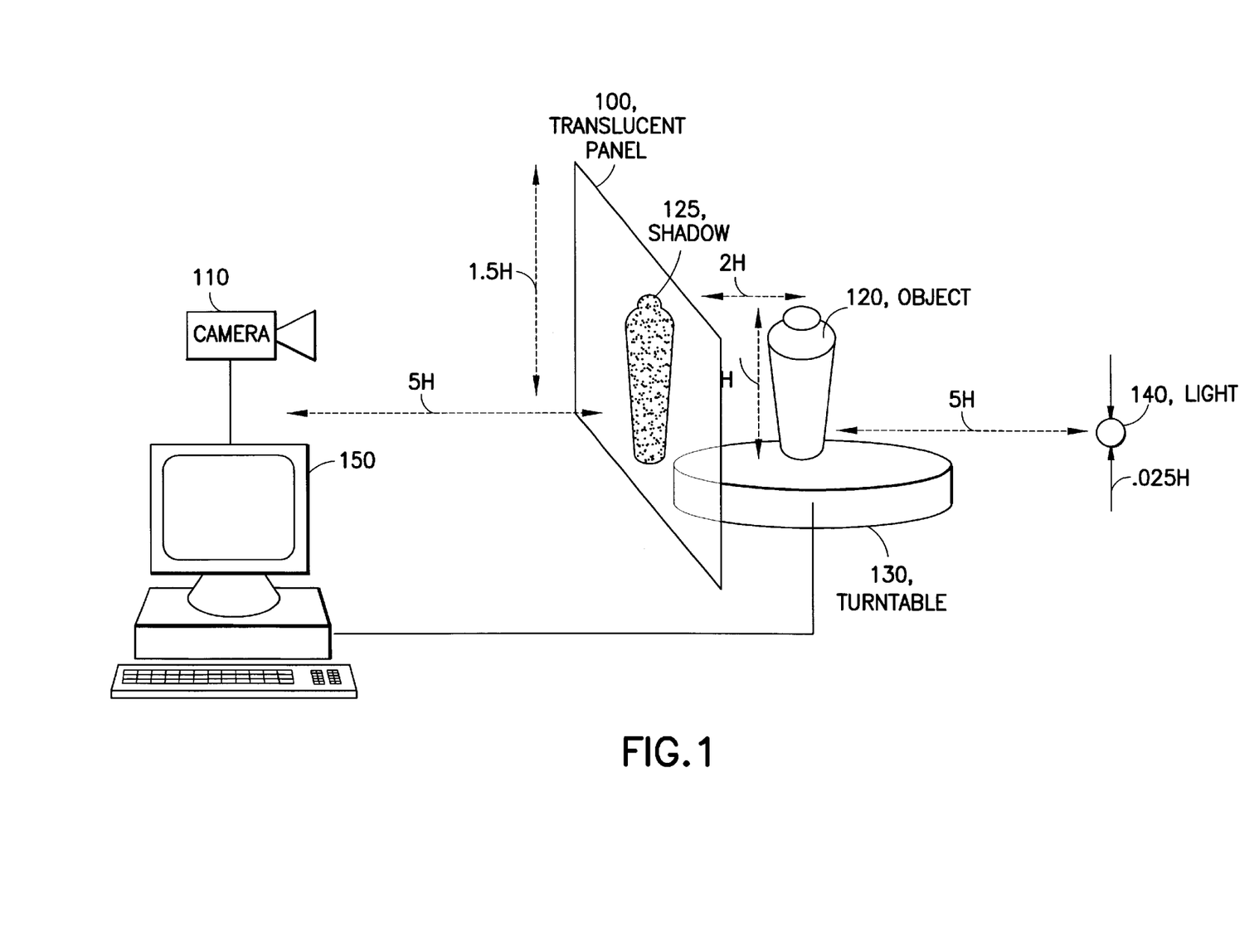
FIG. 1 depicts a presently preferred embodiment of a system for obtaining the shape of an object by observing silhouettes of the object.
Figure 2A:
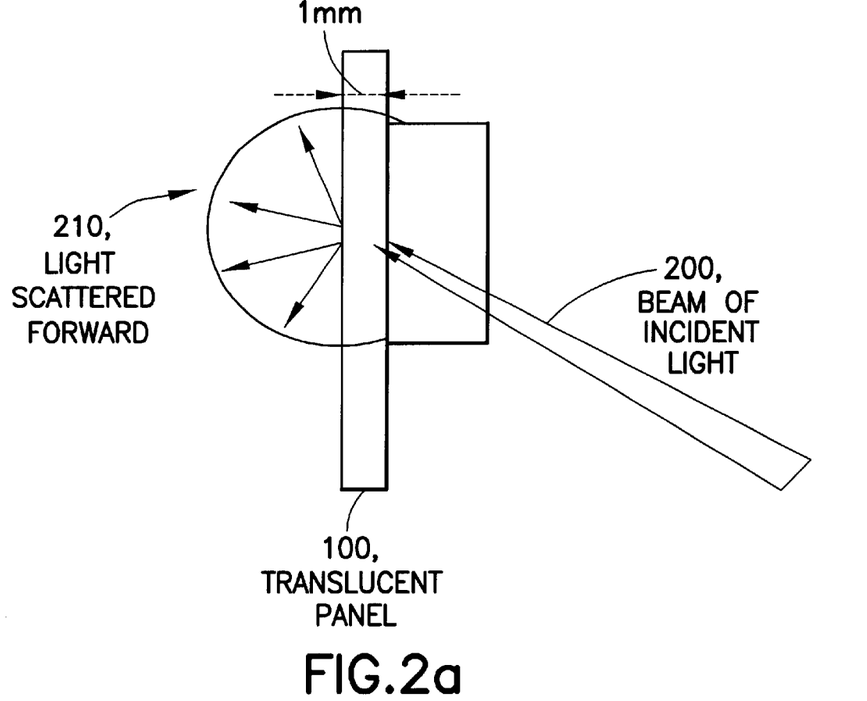
Figure 2B:
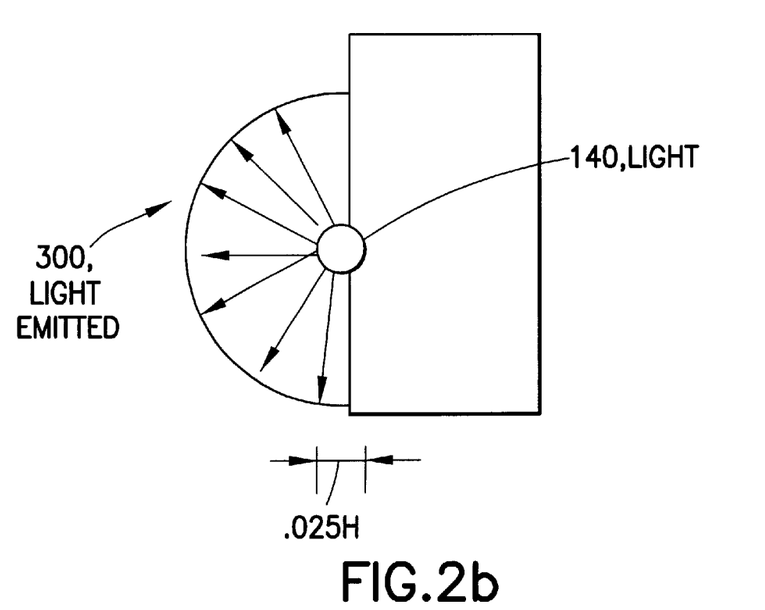

A presently preferred first embodiment of image acquisition apparatus is depicted in FIG. 1. A point light source 140 is placed in front of an object 120 that is to be imaged, thereby casting a shadow 125 on a translucent panel 100. In the preferred embodiment, to measure an object 120 of maximum linear dimension H, the light source has a diameter of about 0.025 H, and is located a distance about 5 H from the object 120. The light source 140 has a nearly uniform intensity output 300 in the direction of the object 120, as is diagramed in FIG. 2b. Referring also to FIG. 2a, the translucent panel 100 is preferably a thin sheet of partially light transmissive material, for example a less than 1 mm thick sheet of diffusely transmitting material. The panel 100 is thin to eliminate significant scattering in the plane of the panel 100, to thereby avoid blurring of the image of the object's shadow 125, and has a forward scattering distribution 210 that is nearly uniform for light 200 incident on the panel 100. The translucent panel 100 is preferably non-colored or color neutral. A sheet of white writing paper with no water marking may be used, with the sheet of paper being sandwiched between thin (3 mm or less) plates of transparent glass for support. Other types of translucent panels may also be used, such as a sheet of certain polymer materials, frosted glass, and other materials that are only partially transmissive to impinging light. The translucent panel 100 is located a distance of about 2H from the object 120, and has dimensions of at least about 1.5H by 1.5H.

The object 120 to be measured is placed on a device that has a calibrated position. In FIG. 1 this device is embodied as a turntable 130 which is controlled by a computer 150. A camera 110 (a black and white, or a color camera) is placed behind the translucent panel 100, and is preferably also controlled by the computer 150 (although manual control of the turntable and/or camera could be used as well.) In the preferred embodiment the camera 110 has a 32 degree field of view (wider angles are preferably avoided to eliminate potential distortion effects in the camera optics), and is located a distance of about 5H from the second, rear surface of the translucent panel 100.

The positions of the camera 110, translucent panel 100 and the light source 140 are calibrated with respect to a coordinate system defined on the turntable 130 (or other positioning device) in its initial position. Any well-known calibration or measurement techniques for obtaining camera parameters and measuring object locations may be used. Assuming that the positions are suitably calibrated, the object 120 need not be located at the center of the turntable 130, the light source 140 need not lie on the optical axis of the camera 110, and the optical axis of the camera 110 need not be perpendicular to the plane of the translucent plate 100.

What is important to the operation of the imaging system is that: (a) the light from source 140 is incident on the front of the object 120 (i.e. light source 140 is in front of the object 120, or the direction of light from the source 140, if behind the object 120, is redirected to be incident from the front of the object 120 by the use of a mirror or mirrors), (b) the object 120 is in front of the translucent panel 100, and the panel 100 is in front of the camera 110.

For each rotation increment of the turntable 130 the object 120, and hence its shadow 125, assumes a different pose with respect to the image plane of the camera 112. The rotation increment of the turntable 130, and hence the number of poses attained by the object 120, may be a function of the surface complexity of the object 120, as the more complex is the surface shape the more shadow images will be required to capture the surface shape. That is, the rotation increment of the turntable 130 may be larger when the object 120 is a coffee cup as compared to the rotation increment when the object 120 is a decorative vase.

As an example, if the object 120 is a coffee mug with a handle, the rotation increment of the turntable 130 may be about 30 degrees.

Figure 3:
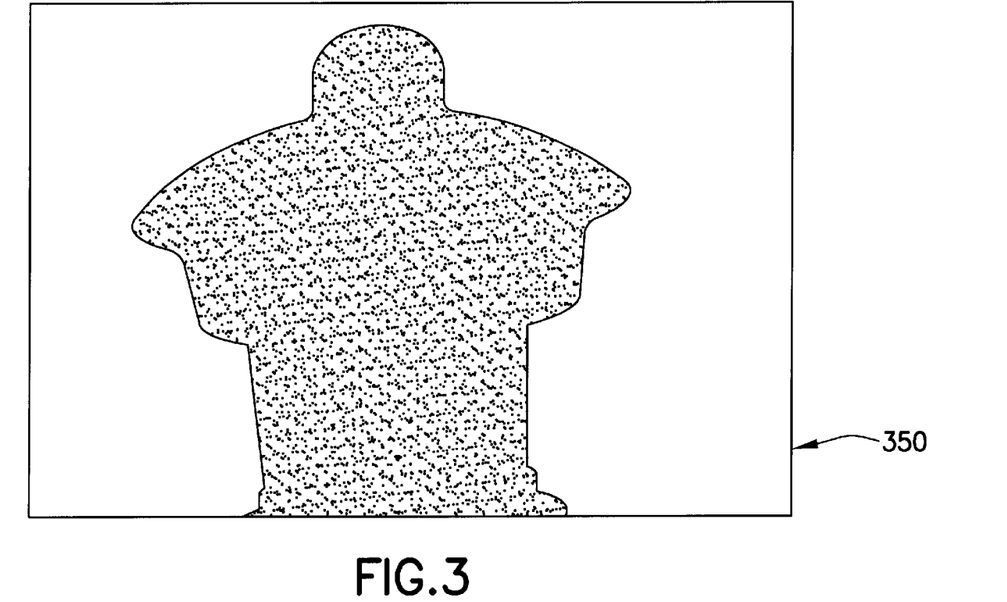
FIG. 3 shows an exemplary shadow image produced by the acquisition system of FIG. 1.
Figure 4:
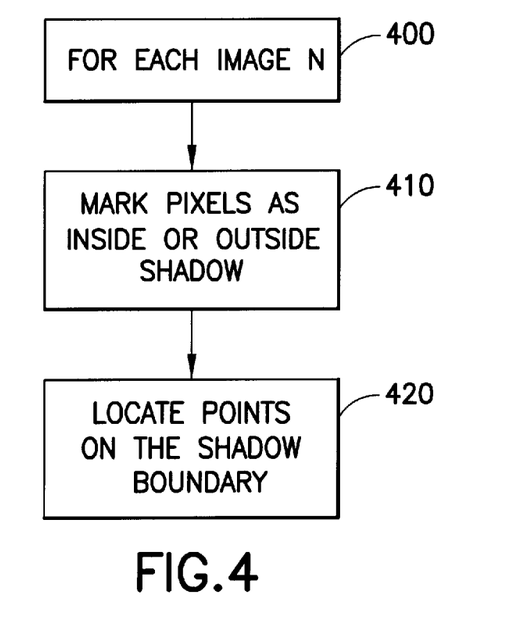
FIG. 4 is a logic flow diagram of the processing of the shadow image of FIG. 3.
Figure 5:
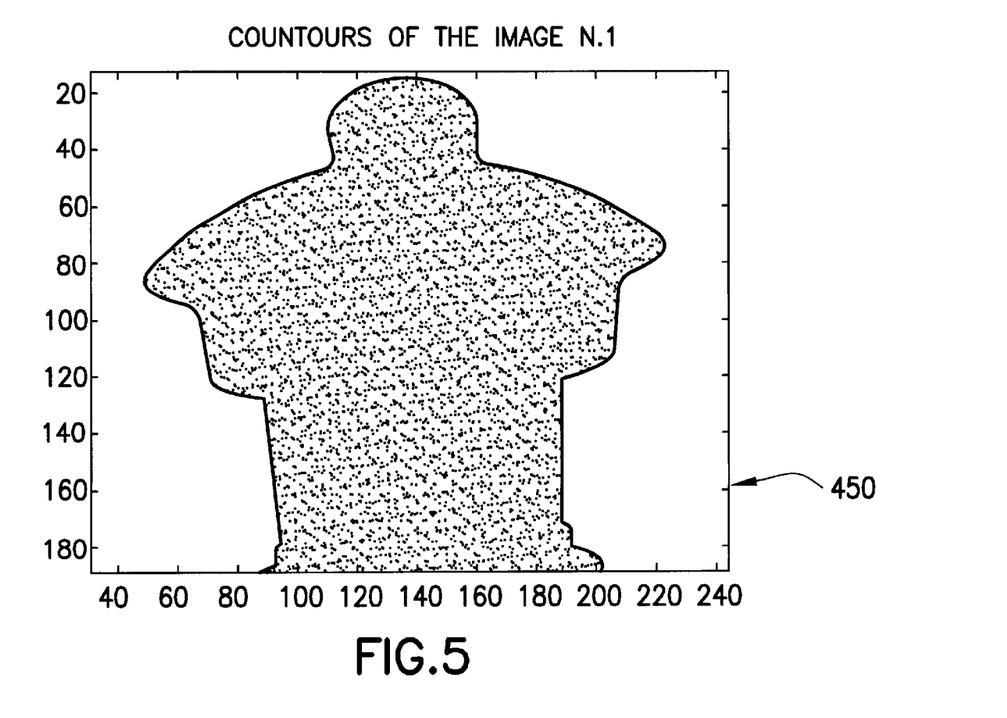
FIG. 5 shows an image of a contour found in the shadow image after processing.

An image is taken by the camera I 10 with respect to each pose of the object 120. The images that are acquired by the system, such as the exemplary object shadow image 350 shown in FIG. 3, are processed using the method shown in FIG. 4. In a loop 400 for each shadow image, each pixel is identified as being inside or outside the shadow in process 410. Any suitable pixel thresholding analysis may be used in process 410, such as the well-known k-means algorithm for unsupervised identification of clusters of values. The boundary of the shadow 125 is then found in process 420 with, preferably, sub-pixel accuracy using any image edge detector, such as the well-known Sobel edge detector. The exemplary shadow image 450 in FIG. 5 shows the results of processing image 350 with the method shown in FIG. 4.

Figure 6:
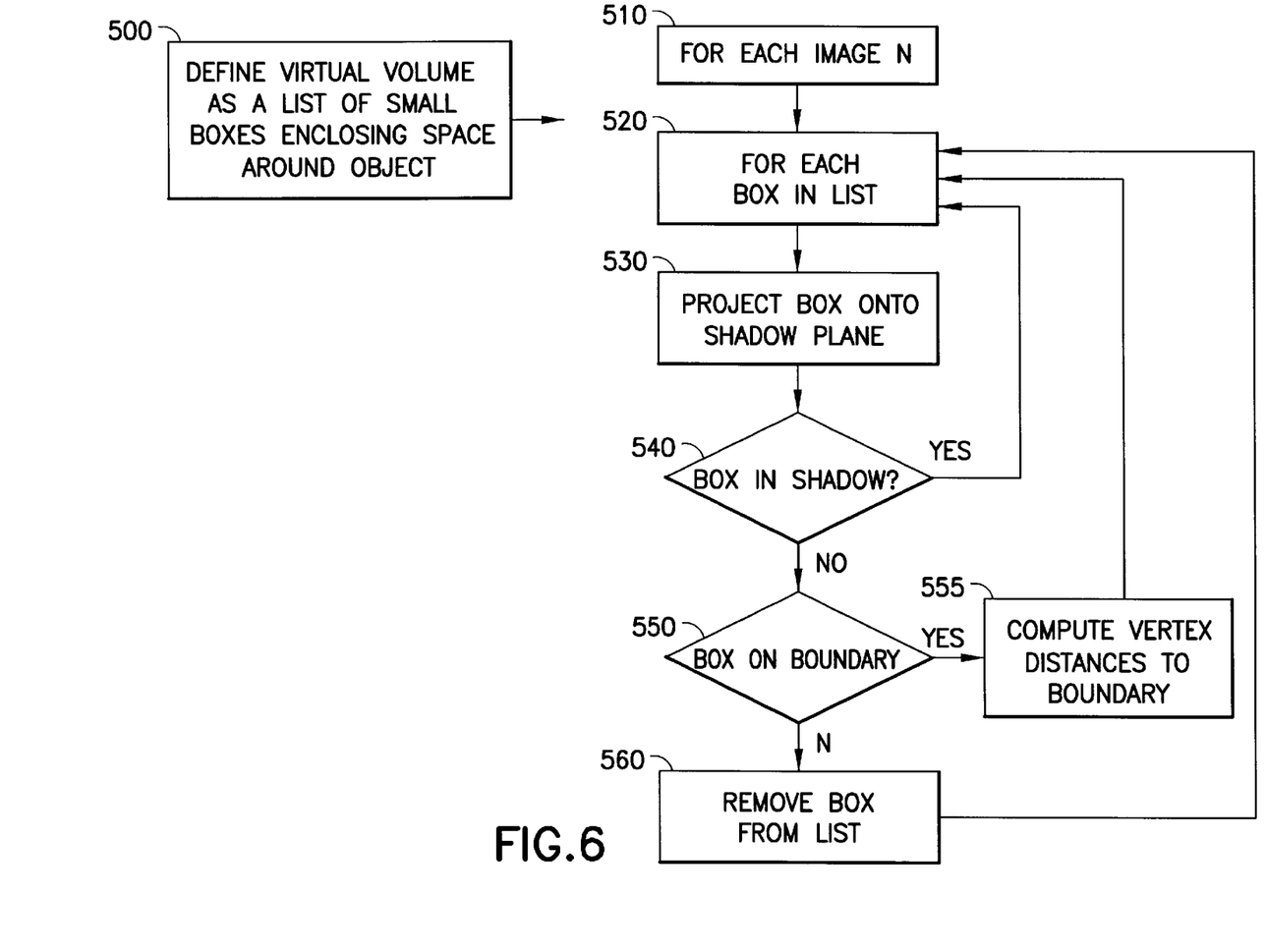
FIG. 6 is a logic flow diagram of the processing of the images with contours into a shape approximation in the form of a set of volume elements, also referred to as boxes.

Any suitable method may be employed for obtaining an estimated shape from silhouettes may be used to estimate the object shape from the derived object contours, such as the contour shown in the image 450. The preferred embodiment shown in FIG. 6 uses a volume carving approach. In step 500 a virtual array of volume elements (such as, but not limited to, boxes) of dimension h×k×l are defined, where h,k and l are 0.01 H or less, in the coordinate system defined on the turntable 130, such that the extent of the array encompasses the full object 120. Initially all vertices on all volume elements are assigned a signed-distance value (i.e., negative for inside the object 120, positive for outside the object 120) of −0.01H. This indicates initially that all vertices are inside the object 120. For the loop 510 over each image acquired, the volume elements in list 520 are projected along lines emanating from the light source 140 position and ending on the plane of the translucent panel 100 using processes 530. A test 540 is performed to determine if the volume element (box) is projected into the shadow region. If the result of test 540 is no, another test 550 is performed to see if the box is projected on the boundary of the shadow region. If the result of test 550 is yes, a process 555 computes a new signed-distance that is assigned to each vertex of the volume element equal to the distance of the projection of the vertex to the shadow boundary. If the result of the test in process 550 is no, the volume element is marked "out" in step 560, given a signed distance value of 0.01H, and is eliminated from list of volume elements for the processing of subsequent images.

Figure 7:
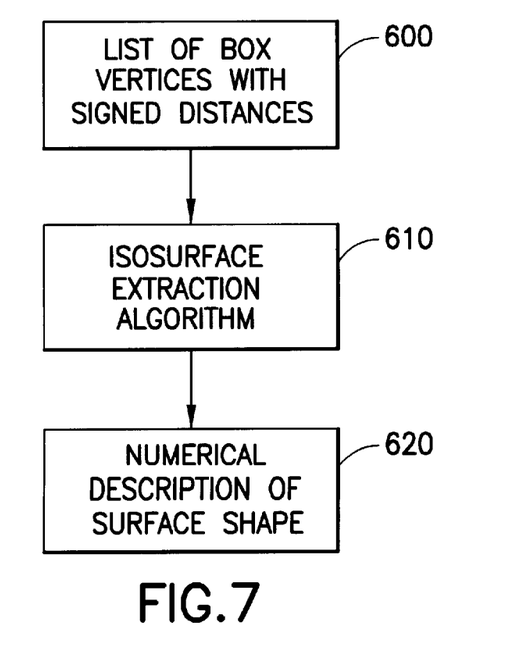
FIG. 7 is a logic flow diagram of the processing of the set of boxes computed in accordance with FIG. 6 into a surface.

The further processing of the list of boxes (or volume elements) 600 is shown in FIG. 7. The numerical description of the object shape 620 is extracted by using any well-known isosurface algorithm 610 to find the surface that passes through the volume at signed-distance values of zero.

Figure 8:
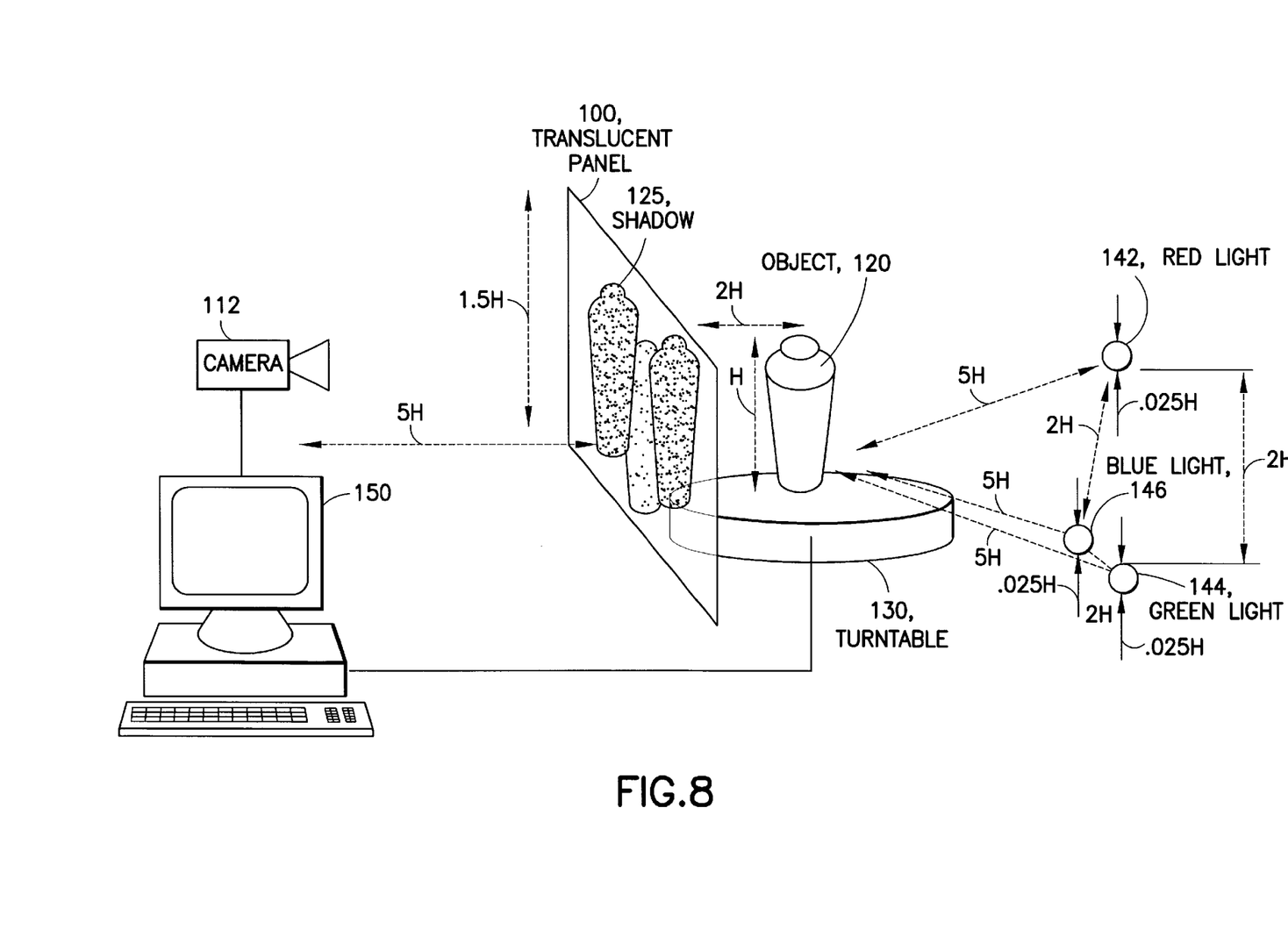
FIG. 8 is a block diagram of a second embodiment of the image acquisition system in accordance with these teachings, wherein three color light sources are used in lieu of the single light source of FIG. 1.

FIG. 8 shows a second embodiment of the image acquisition system, wherein components that are also found in FIG. 1 are numbered accordingly. A plurality of radiation sources (in this case three sources 142, 144 and 146), each with a narrow, but not necessarily visible, spectral distribution are used in place of the single point light source 140. In the preferred system, point lights with red 142, green 144 and blue 146 filters are used. The sources 142, 144 and 146 are arranged in this embodiment in a triangular shape, with each light source being placed at a vertex of the triangle, and separated from adjacent sources by about 2H. The size of the light sources is again 0.025H, and the plane of the triangularly-disposed light sources is located about 5H from the object 120. The camera 112 that is used is capable of sensing radiation in each of the spectral bands. For point light sources with visible red 142, green 144 and blue 146 filters a commodity digital camera 112 can be used. Each time the turntable 130 is moved a color image is obtained, with three separate shadows for the red, green and blue sources. The N images are processed as before (i.e., as in FIGS. 4, 6 and 7), with a total of 3N images being processed, and with each of the color images being separated into three grey-scale images.

Figure 9:
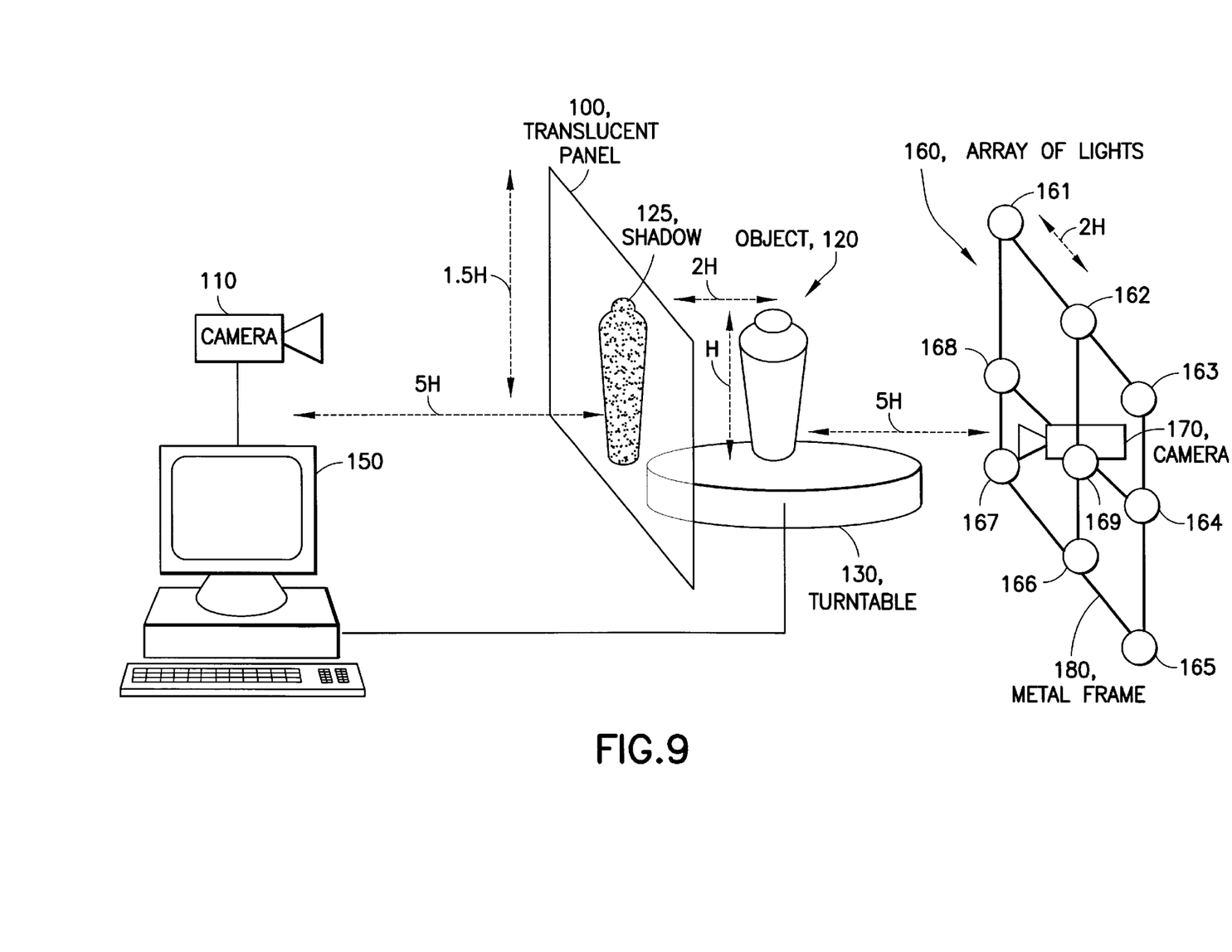
FIG. 9 is a block diagram of a third embodiment of the image acquisition system, wherein an array of light sources replaces the single light source of FIG. 1.

FIG. 9 shows a third embodiment of the system, wherein components that are also found in FIG. 1 are numbered accordingly. In this embodiment an array 160 of M light sources (in this case M=9) is used in place of the single light source 140. The light sources 161, 162, 163, 164, 165, 166, 167, 168, 169 are mounted on a frame 180, with a distance 2H between adjacent light sources, and the plane of the array 160 of light sources is located about 5H from the object 120. A color camera 170 is placed in front of the object 120 adjacent to light source 169 (i.e., at about the center of the array 160. As each light source (161, 162, 163, 164, 165, 166, 167, 168, 169) is illuminated in turn, both cameras (170 and 110) acquire an image. A series of M shadow images and M color images are thus obtained for each position of the turntable 130. The shadow images are processed as before (i.e., as in FIGS. 4, 6 and 7). This embodiment thus uses photometric stereo techniques to obtain additional shape information, and assumes the use of the visible spectrum of light.

Alternatively, the array of M light sources 160 can be replaced by a single point source and a mechanism to translate the point light source to different known positions. For example, person or a machine may move a single light with a tracking system and record the light position each time an image is acquired. A single light source can also be made to impinge on the object 120 from many different directions by reflecting against a mirror that is controlled to move into a series of known positions.

Figure 10:
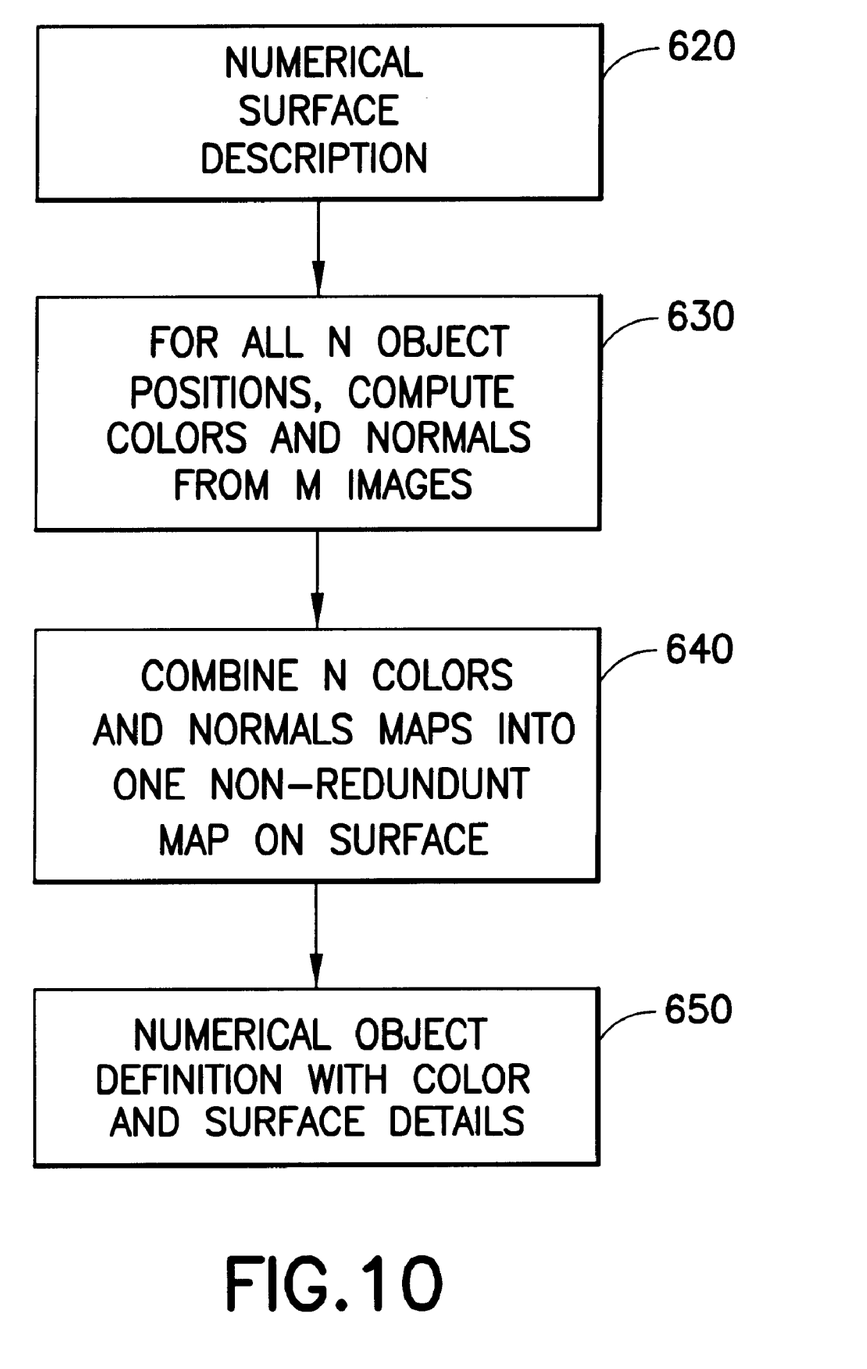
FIG. 10 is a logic flow diagram of the image processing associated with the output from the third embodiment of this invention shown in FIG. 9, wherein detail and color are added to the surface.

The processing of the M color images obtained by the camera 170 is shown in FIG. 10. Using the numerical surface description 620 obtained in FIG. 7, in step 630 the M color images are processed by means of a photometric stereo technique, preferably one described in Rushmeier et al. "Acquiring Input for Rendering at Appropriate Levels of Detail: Digitizing a Pieta", Proceedings of the 9th Eurographics Rendering Workshop, Vienna, Austria, June 1998, and in Rushmeier and Bernardini, "Computing Consistent Normals and Colors from Photometric Data", Proceedings of 3DIM '99, Ottawa, Canada, October, 1999, incorporated by reference herein, to produce detailed maps of color and surface normals for the object 120. In step 640 the color and surface normal maps are projected on to the estimated shape of the object 120 and combined into a single non-redundant map of normals and colors by the methods described in Bernardini et al., "High-Quality Texture Synthesis from Multiple Scans", IBM Research Division Report, RC21656, Feb. 1, 2000, incorporated by reference herein. The result is a model 650 that contains of a numerical description of shape and a map of detailed colors and normals. The resultant model 650 is suitable for display using software available on most commodity personal computers.

Other techniques for deriving surface color and normals maps could be employed as well.

Note should be made that the color camera 170, and the associated processing shown in FIG. 10, could be incorporated as well into the system embodiments shown in FIGS. 1 and 8.

While the invention has been particularly shown and described with respect to preferred embodiments thereof, it will be understood by those skilled in the art that changes in form and details may be made therein without departing from the scope and spirit of the invention.

What is claimed is:

1. A method of obtaining a three dimensional image of an object, comprising the steps of:

shining light from at least one light source on to the object from a first direction to create a first shadow cast by the object on a first surface of a translucent panel, where the object is disposed between a light source and the first surface of the translucent panel and has a first pose;

obtaining a first digital image of the first shadow from a second, opposite surface of the translucent panel;

changing the pose of the object and obtaining additional digital images of additional shadows cast by the object for different object poses; and processing the first and the additional digital images to create a three dimensional image of the object.

2. A method as in claim 1, wherein the step of processing employs a space carving process.

3. A method as in claim 1, wherein the step of processing identifies a boundary of the image of the shadow in each of the first and additional digital images.

4. A method as in claim 3, wherein the boundary is identified in a given one of the digital images by applying a pixel thresholding process to determine whether a given pixel is located within the image of the shadow or outside of the image of the shadow.

5. A method as in claim 3, wherein the step of processing defines a virtual volume as a list of volume elements, projects individual ones of the volume elements onto the plane of the image of the shadow, and retains only those volume elements in the list that lie within the image of the shadow or on the identified boundary.

6. A method as in claim 5, wherein the step of processing further comprises a step of applying an isosurface extraction algorithm to the list of surviving volume elements to obtain a numerical description of the shape of the surface of the object.

7. A method as in claim 1, and further comprising steps of shining light on to the object from a second direction to create an additional shadow cast by the object on the first surface of the translucent panel, and processing an image of the additional shadow in the same manner as the first shadow.

8. A method as in claim 1, wherein the step of shining light operates a plurality of light sources each having a different color.

9. A method as in claim 1, wherein the step of shining operates individual ones of a plurality of light sources in turn to shine light on the object from a plurality of different directions.

10. A method as in claim 1, wherein the step of shining translates a single light source with respect to the object to shine light on the object from a plurality of different directions.

11. A method as in claim 1, and further comprising steps of:

for each object pose, obtaining a digital image of the object;

processing the digital images of the object to derive surface normals and color maps; and applying the surface normals and color maps to the surface of the three dimensional image of the object.

12. A method as in claim 1, wherein the object has a maximum linear dimension of H and is located about 2H from the first surface of the translucent panel, wherein the light source is located about 5H from the object, and wherein the image is obtained with a camera located about 5H from the second surface of the translucent panel.

13. A method as in claim 12, wherein the translucent panel has dimensions of at least about 1.5 H.

14. A method as in claim 12, wherein the light source has a size of about 0.025 H.

15. A system for obtaining a three dimensional image of an object, comprising:

a translucent panel;

a mechanism for changing the pose of the object;

at least one light source for illuminating the object from a first direction to create a first shadow cast by the object on a first surface of said translucent panel, where the object is disposed between said at least one light source and said first surface of said translucent panel;

a camera for obtaining a first digital image of the first shadow from a second, opposite surface of said translucent panel; and a controller, responsive to said first digital image and to additional digital images of additional shadows cast by the object for different object poses, for processing the first and the additional digital images to create a three dimensional image of the object.

16. A system as in claim 15, wherein said controller employs a space carving process.

17. A system as in claim 15, wherein said controller processes the first and the additional digital images to identify a boundary of the image of the shadow in each of the first and additional digital images.

18. A system as in claim 17, wherein the boundary is identified in a given one of the digital images by applying a pixel thresholding process to determine whether a given pixel is located within the image of the shadow or outside of the image of the shadow.

19. A system as in claim 17, wherein said controller processes the first and the additional digital images to define a virtual volume as a list of volume elements, to project individual ones of the volume elements onto the plane of the image of the shadow, and to retain only those volume elements in the list that lie within the image of the shadow or on the identified boundary.

20. A system as in claim 19, wherein said controller further processes the first and the additional digital images by applying an isosurface extraction algorithm to the list of surviving volume elements to obtain a numerical description of the shape of the surface of the object.

21. A system as in claim 15, wherein there are a plurality of light sources for illuminating the object from a plurality of directions for creating additional shadows cast by the object on said first surface of said translucent panel, and wherein said controller processes images of the additional shadows in the same manner as the first shadow.

22. A system as in claim 21, wherein said plurality of light sources each have a different color.

23. A system as in claim 21, wherein individual ones of said plurality of light sources are operated in turn to illuminate the object from a plurality of different directions.

24. A system as in claim 15, and further comprising means for translating said light source with respect to the object to illuminate the object from a plurality of different directions.

25. A system as in claim 15, and further comprising a second camera, said controller being responsive to each object pose for obtaining a digital image of the object with the second camera; for processing the digital images of the object to derive surface normals and color maps; and for applying the surface normals and color maps to the surface of the three dimensional image of the object.

26. A system as in claim 15, wherein the object has a maximum linear dimension of H and is located about 2H from said first surface of said translucent panel, wherein said light source is located about 5H from the object, and wherein said camera is located about 5H from said second surface of said translucent panel.

27. A system as in claim 26, wherein said translucent panel has dimensions of at least about 1.5 H.

28. A system as in claim 26, wherein said light source has a size of about 0.025 H.

* * * * *